United States Patent [19]

Petersen

[11] Patent Number: 4,637,425

[45] Date of Patent: Jan. 20, 1987

[54] SEWER CHECK VALVE WITH CUTTING SEAT

[76] Inventor: Robert E. Petersen, R.R. 1 Box 254, Walcott, Iowa 52773

[21] Appl. No.: 869,608

[22] Filed: Jun. 2, 1986

[51] Int. Cl.$^4$ ............ F16K 31/02; F16K 15/18; F16K 31/18; F16K 33/00

[52] U.S. Cl. .................... 137/412; 137/390; 200/84 R; 251/68; 251/74; 251/76; 251/77; 340/625

[58] Field of Search ............ 137/390, 392, 412, 434, 137/554, 242, 243, 522, 523, 527; 200/84 R; 251/68, 73, 74, 76, 77, 78, 157, 297, 113, 360, 364, 176; 340/620, 623, 625

[56] References Cited

U.S. PATENT DOCUMENTS

| | | | |
|---|---|---|---|
| 372,494 | 11/1887 | Shepherd | 251/68 |
| 961,738 | 6/1910 | Stickel | 137/523 |
| 1,233,659 | 7/1917 | Fox | 251/78 |
| 1,687,860 | 10/1928 | Fosnaugh et al. | 137/543.13 |
| 1,899,154 | 2/1933 | Karrick | 137/242 |
| 1,991,081 | 2/1935 | Charpier | 137/412 |
| 2,363,117 | 11/1944 | Butler | 251/68 |
| 2,904,064 | 9/1959 | Davis | 251/74 |
| 2,910,079 | 10/1959 | Beeghly | 251/68 |
| 3,381,933 | 5/1968 | Derhammer | 251/73 |
| 3,817,278 | 6/1974 | Elliot | 137/527 |

*Primary Examiner*—George L. Walton
*Attorney, Agent, or Firm*—Glenn H. Antrim

[57] ABSTRACT

In place of one of the usual blunt seats, a sewer check valve has a knife-edge extending from one of the seats to eliminate holding of compressed, relatively tough chunks of sewage between seats by cutting through the chunks, and has room for the cut pieces to move away from the seats. The flap of the valve has a lever extending therefrom, and a spring actuated rod retained by a catch is released to strike against the lever for forcing the flap against the knife-edge. The catch may be released manually, but is preferably released by slightly delayed operation of a solenoid in response to operation of a level sensing device in the housing of the valve.

8 Claims, 2 Drawing Figures

SEWER CHECK VALVE WITH CUTTING SEAT

BACKGROUND OF THE INVENTION

This invention pertains to sewer check valves or backup valves and particularly to check valves having means for applying mechanical pressure to ensure tight closing. In addition, the present valve has a sharp cutting edge at the valve seat.

Check valves that have respective flaps to cover smooth seals about the inlets resulting from pressure of backup sewage are commonly used. Even though pressure against the flaps applied from the backup may be substantial, nevertheless, the valves often fail to prevent backup of sewage into basements. Failure is likely because heavier materials in sewage lodge between the mating seals and prevent full closure of the valves, especially when only the pressure of the backup is forcing the flap against the inlet seal.

As shown in U.S. Pat. No. 3,817,278 issued to Robert E. Elliott on June 18, 1974, spring pressure is used to control closure of check valves in gas lines. However, the spring pressure is usually adjustable because the tension of the spring is related to the pressure of gas within the valve. A valve with both seals being V-shaped is shown in U.S. Pat. No. 1,687,860 issued to G. S. Fosnaugh et al on Oct. 16, 1928. This valve is a slush-pump valve rather than a check valve and reciprocates with the pump in the system with which it is connected to grind small objects such as small pieces of rock. The entire V-shaped surface of one of the seats fitting closely within the surface of the other seat suitable for grinding rocks does not provide an unobstructed sharp edge for cutting chunks of sewage in backup valves.

SUMMARY OF THE INVENTION

In the present invention, a thin seal of durable metal with a knife-edge extends from the normal inlet as a seat. A flap differs from a conventional flap in that a lever extends from the pivotal portion of the flap. An actuating rod slidingly connected to the housing of the valve is urged by a spring toward the lever in a direction to force the flap against the knife-edge, but during normal flow of sewage, the actuating rod is withdrawn from the lever and is locked against the force of the spring. At the beginning of backup, a releasing mechanism is operated either manually or automatically to release the actuating rod to permit it to strike the lever. Any sewage lodged within the seat is cut, and the clearance about the knife-edge is sufficient to permit required movement of sewage for closing the valve tightly. The spring continues to exert pressure for maintaining the valve closed.

Preferably, the actuating rod is released automatically by a solenoid. A float positioned within the housing of a valve closes a switch in response to rise of sewage in the housing above a predetermined level. An electrical control circuit, comprising mostly relays, connected between the switch and the releasing mechanism responds to closure of the switch to energize the solenoid for releasing the actuating rod. In order to prevent release during only a normal, momentary, large flow of sewage, the control circuit preferably delays energization of the solenoid for several seconds.

DESCRIPTION OF THE PREFERRED EMBODIMENT

Figure 1:
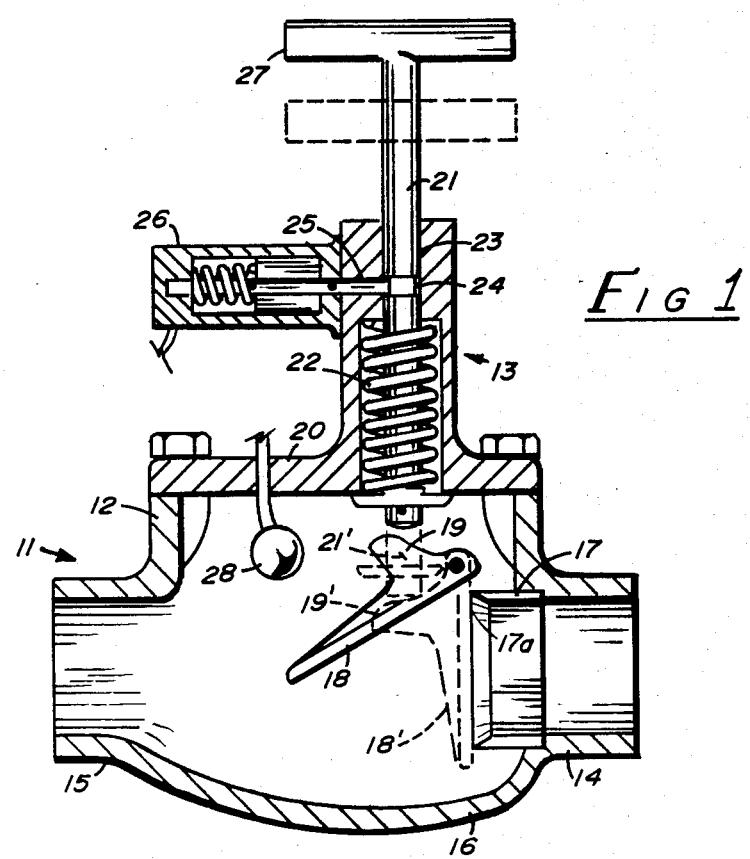
FIG. 1 is a longitudinal, cross-sectional view of the present check valve showing a knife-edge seal and an actuating rod for sharply closing the valve.

The check valve shown in FIG. 1 has a cast housing 11 with an upper portion 12 from which extends upward a smaller tubular portion 13. An inlet 14 and an opposite outlet 15 positioned slightly above the bottom 16 of the housing 11 provide connections to the drain of the building and the main sewer respectively. The moderate amount of space in the housing below both the inlet and the opposite outlet provide unobstructed flow of sewage to clear the valve seat. A strip of durable metal 17 with a knife-edge 17a is formed into a cylinder or ring and is secured tightly within the inside surface of the inlet 14 such that the knife-edge 17a along one edge faces evenly inward to function as a seat of the check valve. The cutting ring 17 extends sufficiently into the interior of the housing 11 such that pliant but tough materials in sewage have room to flow from the knife-edge when the materials are cut thereby.

A suitable cutting seal 17 may be made from tubing of stainless steel. The inside surface of the inlet 14 is machined to provide a smooth surface into which the seal 17 is pressed, and the seal 17 may be cooled before being inserted in order to provide a very tight fit. Should a sewer cleaning rod damage the knife-edge 17a after the valve is in service, a special tool may be used to withdraw the damaged seal 17 in preparation for a replacement.

A flap 18 having a diameter somewhat greater than the diameter of the knife-edge seal is pivoted in a normal manner slightly above the seal 17 such that during back flow, the flap 18 presses tightly against the knife-edge seal 17. The flap 18 as shown in solid lines is in a usual position when a full flow of sewage in the outward direction is present. A rigid lever 19 extends nearly perpendicularly from the flap 18 for a substantial distance from the portion of the flap 18 that is pivoted to the housing 11. When back flow is present, the flap shown in dashed lines as 18' is over the seal 17, and its lever 19' is positioned nearly horizontally and extends for a substantial distance from the pivot of the flap 18.

The upper tubular portion 13 extends upward from a removable cover 20 that is normally sealed to the upper portion 12 of the housing 11. The tubular portion is centered above a point on the lever 19 near the end spaced from its pivot. Approximately the lower half of the tubular portion 13 is hollow to accommodate a compression spring 22, and the upper portion has a central bore of proper diameter to provide a sliding fit for an actuating rod 21.

When the actuating rod 21 is in an upper position as shown in solid lines, the extreme lower end thereof may be almost even with the inner surface of the cover 20, and the actuating rod 21 is held in that position by a catch 25 that has an end in a circular groove 24 around the intermediate portion of the rod 21. A horizontal bore into which the catch 25 is a sliding fit is located a short distance above the hollow portion for containing the spring 22 and extends in a radial direction from the outer wall of the tubular portion 13 into its central bore 23 for the actuating rod 21. The spring 22 is quite strong and is in a very much compressed condition while the rod 21 is held upward by the catch 25. The upper end of the helical spring 22 bears against the upper portion of the tubular portion 13, and the lower end of the spring bears against a washer secured about the lower end of the actuating rod 21. The washer may be secured by any usual manner, for example, by a pin through the lower end of the rod.

For manual operation, a spring (not shown) about the catch 25 other than that in a solenoid assembly may be provided for urging the catch 25 inward, and the outer end of the catch provided with a handle. When the catch 25 is to be operated manually, a tenant of a building must be notified either by an alarm or by observation that back flow exists. By this time, the flap 18 may be substantially downward in a closed position. If pressure from back flow against the flap 18 is sufficient and if a fairly large piece of tough material is not positioned over the seal 17, the valve may be tightly closed and functioning properly. Often these desired conditions are not present, and damage within a building is likely. Therefore the tenant withdraws the catch 25 sufficiently to permit the spring 22 to force the actuating rod 21 downward rapidly. Since the rod travels a moderate distance before striking the lever 19, the hammering action against the lever 19 is very effective to move the flap 18 for cutting through sewage about the knife-edge 17. Sufficient room about the knife-edge 17 prevents compression of material between the flap and the inlet 14 and therefore aids effective cutting action. When the condition causing the back flow has ended, the handle 27 at the upper end of the actuating rod 21 is utilized to pull upward on the actuating rod 21 until the spring about the catch 25 causes the catch to engage the groove 24.

Figure 2:
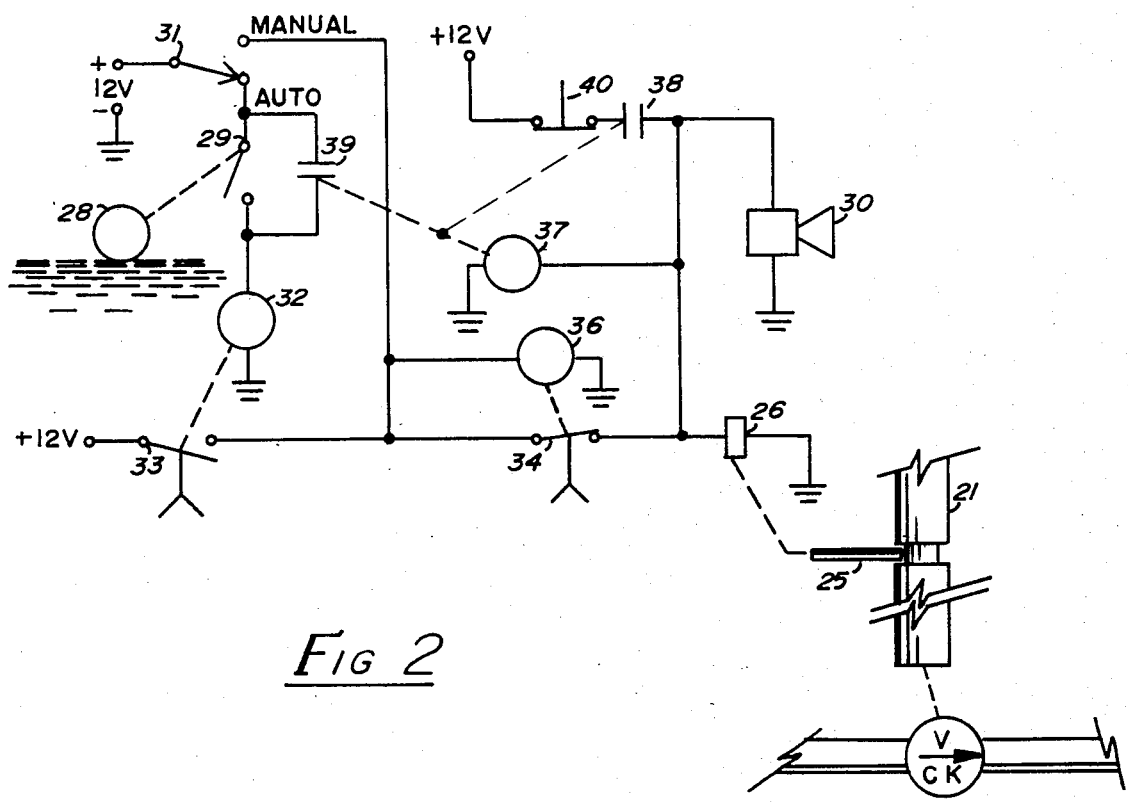
FIG. 2 is a schematic diagram of a control circuit for releasing the actuating rod shown in FIG. 1.

Since water damage may occur before a tenant is cognizant of backflow, automatic release of the actuating rod 21 is preferred. As shown in FIG. 1, a commercially available float 28 within the top of the housing 11 has a flexible support containing connecting leads through the cover 20. The float or ball 28 contains a small amount of mercury and electrodes to which the leads are connected. When backup sewage rises to the level in the housing to cause the float 28 to be tipped from its normal, suspended position, the interior mercury switch shown as switch 29 in FIG. 2 is closed. The closure of the switch causes the catch 25 to be withdrawn for releasing the actuating rod 21 and operates a circuit for sounding an alarm 30. Other available level sensing and electrical input devices may be substituted for the float 28.

Desirable automatic release of the actuating rod 21 is provided by conventional components connected in the circuit of FIG. 2. A 12-volt battery maintained charged in a usual manner from an alternating-current line is preferred rather than deriving power directly from the line. The local source of power ensures complete closure of the valve during stormy weather when operation is most likely to be required during disruption of alternating-current power. This preferred conventional source of power and also usual indicator lights are not shown. The indicator lights are preferably connected across the sources of power and across the relay 32.

A selector switch 31 has a manual position and an automatic position. When the switch 31 is in the automatic position, the circuit is completed from the positive terminal of the 12-volt source through the float switch 29 when it is operated, and through the winding of a relay 32 to the other terminal of the source. The relay 32 has delayed-operating, normally open contacts 33 that close five seconds after the relay 32 is energized to complete a circuit for operating the solenoid 26 from the 12-volt source through the contacts 33, normally closed contacts 34, and through the winding of the solenoid 26 to the other terminal of the source. Contacts 33 are also connected through the winding of a relay 36 for opening the contacts 34 five seconds after energization and therefore five seconds after the float 28 has risen to an abnormally high level. An alarm 30 and the winding of a relay 37 are connected in parallel with the solenoid 26 so that the alarm 30 sounds and the relay 37 is energized when the contacts 33 close for releasing the actuating rod 21.

The operation of the relay 37 closes contacts 38 that function as holding contacts across the contacts 34 for maintaining the circuit of the alarm 30 closed, and closes contacts 39 in parallel with the contacts 29 of the float to maintain the control circuit operated until it is manually released. Delayed opening of the contacts 34 by the relay 36 prepares release of the alarm 30 and the solenoid 26 in response to subsequent momentary manual operation of the normally closed switch 40.

The operation of the switch 31 to its manual position is especially useful for checking proper operation other than the operation of the switch 29 connected to the float 28. In the manual position the switch 31 performs the function of the contacts 33 of the relay 32 and therefore the operation of solenoid 26, and the relays 36 and 37 can be observed. Obviously, if it is desired, closure of the valve can be ensured on manual operation independent of the operation of the switch 29. After either manual or automatic operation, the actuating rod 21 is reset when desired to its cocked position as described above.

Preferably for ease of manufacture and to provide least resistance to passage of sewage, the knife-edge 17 is the stationary seat about the inlet. However, the feature of cutting through sewage should also be obtained by having the knife-edge 17 attached to the flap 18 and having a smooth blunt sealing surface about the inlet 14.

I claim:

1. A positively operating sewer check valve comprising:
    a housing having an inlet for normal direction of flow of sewage and an opposite outlet, a flap having a pivotal connection to said inlet to provide check-valve action, the surface about said inlet being a first sealing surface and facing into said housing, said flap having a second sealing surface within the periphery thereof facing said first sealing surface and sealing therewith during closure of said valve, one of said sealing surfaces being a knife-edge facing the other of said sealing surfaces, said other sealing surface being a smooth blunt surface where contacted by said knife-edge to provide unobstructed flow of sewage away from said knife-edge,
    a rigid actuating member operatively connected to said housing, said actuating member having operated and unoperated positions, a spring connected to said actuating member, said flap having a portion spaced from said pivotal connection thereof and contacted by said actuating member at least during operation thereof, said spring while said actuating member is operated urging said flap toward said first sealing surface to aid pressure of any back flow to cut through any sewage between said sealing surfaces, a releasing mechanism connected to said housing and adapted to engage said actuating member, said releasing member normally locking said actuating member in opposition to force of said spring in said unoperated position for allowing said flap to open by the flow of sewage, and means for actuating said releasing mechanism to unlock said actuating member and thereby permitting said spring to urge said actuating member into said operated position to cause the actuating member to engage said flap and urging it to seat against said first sealing surface and aiding pressure of any backflow to cut through any sewage between said sealing surfaces.

2. A sewer check valve as claimed in claim 1 wherein said rigid actuating member is an actuating rod slidingly connected to said housing, said actuating rod being movable longitudinally inward to said operated position and outward in opposition to pressure of said spring to said unoperated position, and a lever extending inward into said housing from said flap, said portion of said flap contacted by said actuating rod being an inward portion of said lever spaced from said pivotal connection.

3. A sewer check valve as claimed in claim 2 wherein said releasing mechanism is a catch slidingly disposed in said housing to engage said shaft, means for urging said catch inward to engage said shaft, a slot in said shaft engaged by said catch for normally locking said shaft while positioned in said unoperated position, and said means for actuating said releasing mechanism being means for withdrawing said catch from said slot.

4. A sewer check valve as claimed in claim 3 wherein said means for withdrawing said catch is a solenoid, a liquid level sensing and electrical control assembly, said liquid level sensing and electrical control assembly extending into said housing to be operated in response to a predetermined level of sewage in said housing, and means connected to said liquid level sensing and electrical control assembly and to said solenoid operative in response to operation of said liquid level sensing and electrical control assembly for operating said solenoid, the operation of said solenoid withdrawing said catch.

5. A sewer check valve as claimed in claim 4 wherein said means connected to said liquid level sensing and electrical control assembly includes a delayed operating relay, said delayed operating relay preventing operation of said solenoid until said liquid level sensing and electrical control assembly is operated for a predetermined interval.

6. A sewer check valve comprising:

a housing having an inlet to be connected to a sewer drain and an outlet to be connected to a sewer main, a valve seat about said inlet inside said housing, a flap hinged to said housing and positioned to cover said seat, a lever protruding integrally from the hinged connection of said flap into said housing, an actuating rod slidingly connected to said housing and directed toward said lever, a spring disposed between said lever and said housing for urging said actuating rod inwardly and directly against said lever to force said flap tightly against said valve seat, a catch between said housing and said actuating rod, said catch being operative in response to said actuating rod being retracted inwardly and directly to retain said rod in opposition to force of said spring at a distance above said lever, the retention of said rod permitting opening of said valve, and means connected to said catch for disengaging said catch from said actuating rod to release said actuating rod for striking said lever to provide an effective seal, while at the same time cleaning any sewage that might have accumulated betwen said flap and said valve seat.

7. A check valve as claimed in claim 6 wherein said means for disengaging said catch is a solenoid, a liquid level sensor disposed in said housing, a switching device connected to said liquid level sensor, said switching device operating in response to sewage in said housing rising to a predetermined level, means connected to said switching device and to said solenoid for operating said solenoid to disengage said catch in response to operation of said switching device.

8. A check valve as claimed in claim 7 wherein said means connected to said switch and said solenoid includes a delayed operating relay to delay disengagement of said catch until sewage has been at said predetermined level for a predetermined interval.

* * * * *